United States Patent
Qi et al.

(10) Patent No.: US 10,329,183 B2
(45) Date of Patent: Jun. 25, 2019

(54) CUTTER HEAD AND CUTTING DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Le Qi, Beijing (CN); Jin Zhang, Beijing (CN); Meng Wang, Beijing (CN); Fuyuan Sun, Beijing (CN); Dongsheng Xu, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 17 days.

(21) Appl. No.: 15/647,176

(22) Filed: Jul. 11, 2017

(65) Prior Publication Data
US 2018/0022632 A1     Jan. 25, 2018

(30) Foreign Application Priority Data
Jul. 21, 2016   (CN) .................... 2016 2 0772904 U

(51) Int. Cl.
*C03B 33/10* (2006.01)
*B28D 1/24* (2006.01)
(Continued)

(52) U.S. Cl.
CPC ............ *C03B 33/107* (2013.01); *B28D 1/225* (2013.01); *B28D 1/226* (2013.01); *B28D 1/24* (2013.01); *C03B 33/027* (2013.01); *C03B 33/0215* (2013.01); *C03B 33/105* (2013.01); *Y02P 40/57* (2015.11)

(58) Field of Classification Search
CPC . C03B 33/107; C03B 33/0215; C03B 33/027; C03B 33/105; B26D 1/225; B26D 1/226; B26D 1/24; Y02P 40/57
See application file for complete search history.

(56) References Cited

U.S. PATENT DOCUMENTS

| | | | |
|---|---|---|---|
| 6,442,852 B1 * | 9/2002 | Shimotoyodome | B28D 1/225 33/18.1 |
| 2006/0137504 A1 * | 6/2006 | Nishio | B28D 1/226 83/875 |
| 2009/0050610 A1 * | 2/2009 | Takamatsu | B28D 5/0011 219/121.72 |

* cited by examiner

*Primary Examiner* — Omar Flores Sanchez
(74) *Attorney, Agent, or Firm* — Kinney & Lange, P.A.

(57) ABSTRACT

A cutter head includes: a support platform; a double curved surface member mounted on the support platform and having a first curved surface and a second curved surface; a cutter wheel support member and a roller wheel support member moveably mounted on the support platform, respectively; a cutter wheel and a roller wheel mounted on the cutter wheel support member and the roller wheel support member, respectively; a first transmission mechanism mounted on the support platform, configured to be mated with the first curved surface, and connected to the cutter wheel support member, so as to transmit a movement of the double curved surface member to the cutter wheel; and a second transmission mechanism mounted on the support platform, configured to be mated with the second curved surface, and connected to the roller wheel support member, so as to transmit a movement of the double curved surface member to the roller wheel. The cutter head has a compact structure, and it improves the levelness of the cutter wheel and the roller wheel, and increases the mechanical precision.

12 Claims, 4 Drawing Sheets

(51) Int. Cl.
*B28D 1/22* (2006.01)
*C03B 33/02* (2006.01)
*C03B 33/027* (2006.01)

CUTTER HEAD AND CUTTING DEVICE

CROSS-REFERENCE TO RELATED APPLICATION

This application claims the benefit of Chinese Patent Application No. 201620772904.0 filed on Jul. 21, 2016 in the State Intellectual Property Office of China, the whole disclosure of which is incorporated herein by reference.

BACKGROUND OF THE INVENTION

Field of the Invention

At least one embodiment of the present disclosure relates to a cutting device for cutting a plate such as a display panel, more particularly, relates to a cutter head and a cutting device for cutting a panel.

Description of the Related Art

In a process of cutting a liquid crystal panel of a thin film transistor liquid crystal display (TFT-LCD), a cutter wheel is driven by a cutter head to cut a glass substrate. However, in a traditional cutting device for cutting a liquid crystal panel, the cutter head, and a support roller for supporting the glass substrate are driven separately. In such cutting device, the cutter head has a huge structure, and it is difficult to adjust levelness between the cutter wheel and the support roller. Moreover, since the cutter head has such huge structure, there is no any protection case on the cutter head and the support roller, and glass chips may easily enter into a cam of the cutter head, affecting the production. In addition, the cutter wheel and the support roller are driven by motors and cams, respectively, increasing the cost of the cutting device.

As for the traditional cutting device, the glass chips may enter into the cutter head during cutting, which may damage the cutter head, furthermore, the probability of abnormal cutting is very high, which may greatly reduce the cutting quality, decrease the cutting yield, and reduce the cutting efficiency. As a result, the product qualified rate and the production efficiency are reduced.

SUMMARY OF THE INVENTION

The present disclosure has been made to overcome or alleviate at least one aspect of the above mentioned and other disadvantages.

In at least one embodiment of the present disclosure, there is provided a cutter head which has a compact structure, improves levelness of a cutter wheel and a roller wheel, and increases a mechanical precision.

According to an aspect of the present disclosure, there is provided a cutter head, comprising: a support platform; a double curved surface member mounted on the support platform and having a first curved surface and a second curved surface; a cutter wheel support member and a roller wheel support member moveably mounted on the support platform, respectively; a cutter wheel and a roller wheel mounted on the cutter wheel support member and the roller wheel support member, respectively; a first transmission mechanism mounted on the support platform, configured to be mated with the first curved surface, and connected to the cutter wheel support member, so as to transmit a movement of the double curved surface member to the cutter wheel; and a second transmission mechanism mounted on the support platform, configured to be mated with the second curved surface, and connected to the roller wheel support member, so as to transmit a movement of the double curved surface member to the roller wheel.

According to an exemplary embodiment of the present disclosure, the cutter head further comprises a protection case mounted on the support platform; and the double curved surface member, the first transmission mechanism and the second transmission mechanism are received in the protection case.

According to another exemplary embodiment of the present disclosure, the double curved surface member comprises a double curved surface cam, the first curved surface and the second curved surface are rotatably symmetrical with respect to each other.

According to another exemplary embodiment of the present disclosure, the first transmission mechanism comprises: a first roller rotatably coupled with the first curved surface of the double curved surface member; and a first positioning seat movably mounted on the support platform. The first roller is rotatably mounted on the first positioning seat, so as to transmit the movement of the double curved surface member to the cutter wheel as the first curved surface drives the first roller to rotate. The second transmission mechanism comprises: a second roller rotatably coupled with the second curved surface of the double curved surface member; and a second positioning seat movably mounted on the support platform. The second roller is rotatably mounted on the second positioning seat, so as to transmit the movement of the double curved surface member to the roller wheel as the second curved surface drives the second roller to rotate.

According to another exemplary embodiment of the present disclosure, the first transmission mechanism further comprises a first transmitting seat provided between the first positioning seat and the support platform and connected to the cutter wheel support member; and the second transmission mechanism further comprises a second transmitting seat provided between the second positioning seat and the support platform and connected to the roller wheel support member.

According to another exemplary embodiment of the present disclosure, the first roller is in contact with the first curved surface in manner of higher pair contact, and the second roller is in contact with the second curved surface in manner of higher pair contact.

According to another exemplary embodiment of the present disclosure, the first transmission mechanism further comprises a first reset spring, the first transmitting seat being moved against a spring force of the first reset spring under driving of the first positioning seat; and the second transmission mechanism further comprises a second reset spring, the second transmitting seat being moved against a spring force of the second reset spring under driving of the second positioning seat.

According to another exemplary embodiment of the present disclosure, the first reset spring is provided between the first transmitting seat and the protection case, and the second reset spring is provided between the second transmitting seat and the protection case.

According to another exemplary embodiment of the present disclosure, the first roller is rotatably connected to the first positioning seat by a first rotation shaft, the second roller is rotatably connected to the second positioning seat by a second rotation shaft.

According to another exemplary embodiment of the present disclosure, a third reset spring is provided between the cutter wheel support member and the support platform, the cutter wheel support member being moved against a spring force of the third reset spring under driving of the first transmitting seat; and a fourth reset spring is provided between the roller wheel support member and the support platform, the roller wheel support member being moved against a spring force of the fourth reset spring under driving of the second transmitting seat.

According to another exemplary embodiment of the present disclosure, the cutter head further comprises a first rail and a second rail fixed to the support platform; the first positioning seat is mounted on the first rail and movable along the first rail in a straight line, and the second positioning seat is mounted on the second rail and movable along the second rail in a straight line.

According to another aspect of the present disclosure, there is provided a cutting device comprises a motor and the above cutter head mentioned in any one embodiment of the present disclosure. A driving shaft of the motor is connected to the double curved surface member of the cutter head by a flat key, so as to drive the double curved surface member to rotate. In this way, it may prevent the motor from being loosened from or moved with respect to the cam, and it ensures the connection strength between them.

In the cutting device according to above various exemplary embodiments of the present disclosure, the cutter head or the support roller wheel may be driven by using a motor to drive a double curved surface member. Thereby, it may reduce the assembly difficulty of adjusting the levelness of the cutter wheel and the roller wheel.

BRIEF DESCRIPTION OF THE DRAWINGS

The above and other features of the present disclosure will become more apparent by describing in detail exemplary embodiments thereof with reference to the accompanying drawings, in which.

DETAILED DESCRIPTION OF PREFERRED EMBODIMENTS OF THE INVENTION

Figure 1:
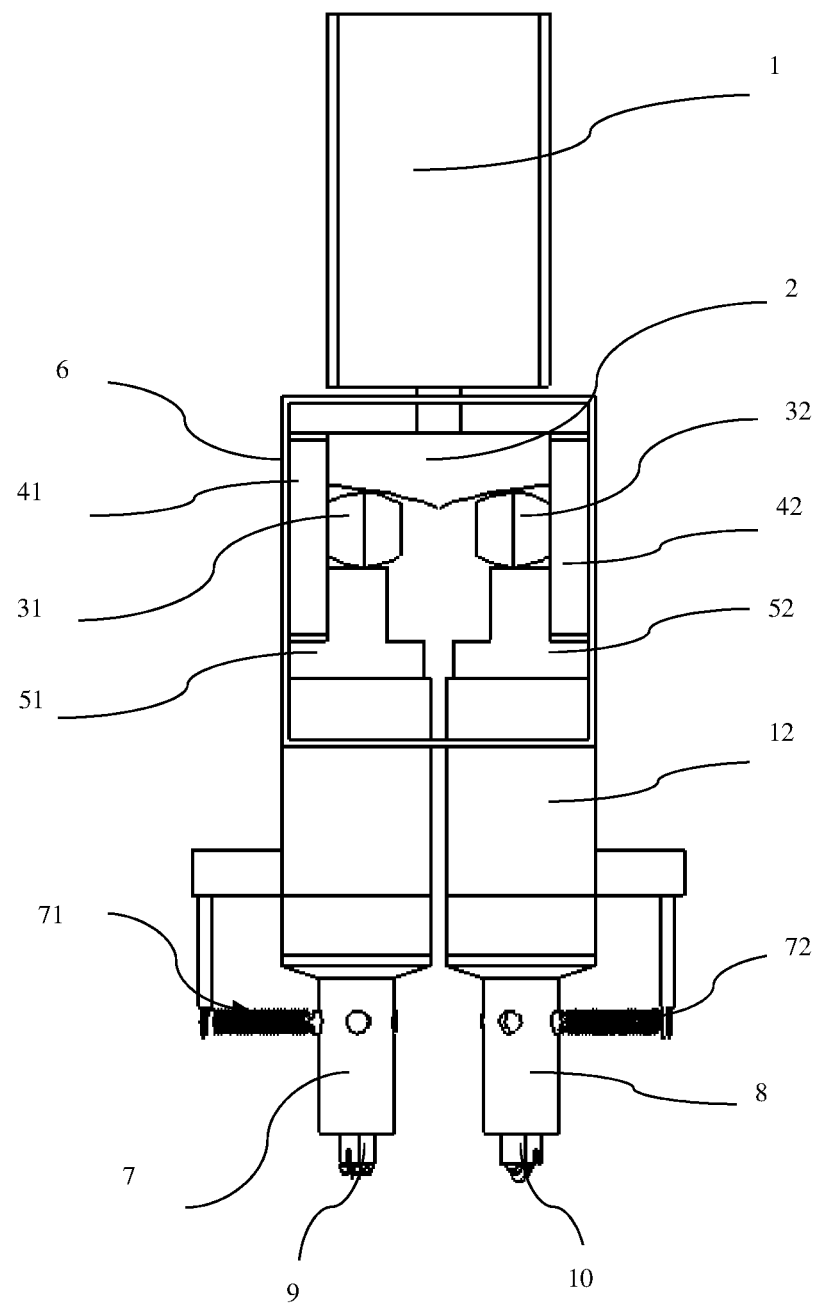
FIG. 1 is a side view of a cutting device comprising a cutter head and a motor according to an embodiment of the present disclosure.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to a general concept of the present disclosure, there is provided a cutter head, comprising: a support platform; a double curved surface member mounted on the support platform and having a first curved surface and a second curved surface; a cutter wheel support member and a roller wheel support member moveably mounted on the support platform, respectively; a cutter wheel and a roller wheel mounted on the cutter wheel support member and the roller wheel support member, respectively; a first transmission mechanism mounted on the support platform, configured to be mated with the first curved surface, and connected to the cutter wheel support member, so as to transmit a movement of the double curved surface member to the cutter wheel; and a second transmission mechanism mounted on the support platform, configured to be mated with the second curved surface, and connected to the roller wheel support member, so as to transmit the movement of the double curved surface member to the roller wheel.

FIG. 1 is a side view of a cutting device comprising a cutter head and a motor according to an embodiment of the present disclosure. As shown in FIG. 1, the cutting device mainly comprises a motor 1 and a cutter head. The cutter head comprises a support platform 12, a double curved surface member 2, a cutter wheel support member 7 for supporting a cutter wheel 9, a roller wheel support member 8 for supporting a roller wheel 10, a first transmission mechanism and a second transmission mechanism.

Figure 2:
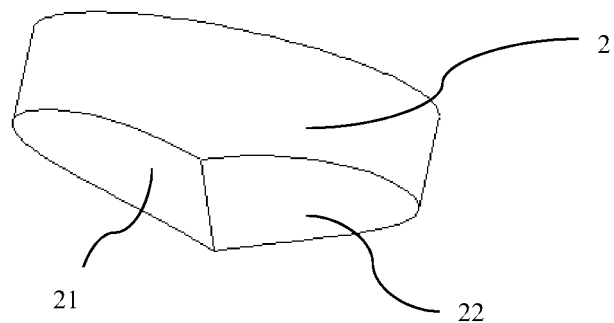
FIG. 2 is an illustrative perspective view of a double curved surface member of the cutter head of FIG. 1.

FIG. 2 is an illustrative perspective view of a double curved surface member of the cutter head of FIG. 1. In an embodiment, as shown in FIGS. 1-2, the double curved surface member 2 comprises a double curved surface cam. The double curved surface cam is connected to a driving shaft of the motor 1, so as to rotate with the motor 1. The double curved surface member 2 is mounted on the support platform 12 and has a first curved surface 21 and a second curved surface 22. The cutter wheel support member 7 and the roller wheel support member 8 are mounted on the support platform 12 in manner of being linearly movable relative to the support platform 12. The first transmission mechanism is mounted on the support platform 12, configured to be mated with the first curved surface 21, and connected to the cutter wheel support member 7, so as to transmit a movement of the double curved surface member 2 to the cutter wheel 9 mounted on the cutter wheel support member 7. The second transmission mechanism is mounted on the support platform 12, configured to be mated with the second curved surface 22, and connected to the roller wheel support member 8, so as to transmit the movement of the double curved surface member 2 to the roller wheel 10 mounted on the roller wheel support member 8.

In the cutter head according to the embodiments of the present disclosure, it should be appreciated for those skilled in this art that the roller wheel 10 is configured to support a panel, for example, a liquid crystal panel of a thin film transistor liquid crystal display (TFT-LCD), to be cut, and the cutter wheel 9 is configured to cut the panel. During cutting, a roller wheel of one cutter head reaches a support position and is cooperated with a cutter wheel of another cutter head to cut the panel.

In the cutter head according to the embodiments of the present disclosure, the structure of the cutter head is simplified by using a single double curved surface member, and the cutter wheel and the roller wheel may be driven by a single driving mechanism, for example, a single motor.

Thereby, it improves levelness and mating precision between the cutter wheel and the roller wheel, and improves the stability of the cutter head.

The cutter head according to an embodiment of the present disclosure may further comprise a protection case 6 mounted on the support platform 12. The double curved surface member 2, the first transmission mechanism and the second transmission mechanism are received in the protection case 6. The protection case 6 may prevent glass chips from splashing into the double curved surface member, thereby avoiding the damage of the cutting device and improving the yield of the cutting process.

In an embodiment, as shown in FIGS. 1-5, the first transmission mechanism comprises: a first roller 31 rotatably coupled with the first curved surface 22 of the double curved surface member 2; and a first positioning seat 41 movably mounted on the support platform 12. The first roller 31 is rotatably mounted on the first positioning seat 41, so as to transmit the movement of the double curved surface member 2 to the cutter wheel 9 when the first curved surface 21 drives the first roller 31 to rotate. The second transmission mechanism comprises: a second roller 32 rotatably coupled with the second curved surface 22 of the double curved surface member 2; and a second positioning seat 42 movably mounted on the support platform 12. The second roller 32 is rotatably mounted on the second positioning seat 42, so as to transmit the movement of the double curved surface member 2 to the roller wheel 10 when the second curved surface 22 drives the second roller 32 to rotate.

In an embodiment, the first curved surface 21 and the second curved surface 22 are rotatably symmetrical with respect to each other. That is, the first curved surface 21 and the second curved surface 22 have the same size and shape. In this way, the cutter head 9 and the roller wheel 10 may have the same moving track. In an embodiment, the double curved surface cam may be configured so that a route of the cutter head moving downward and a route of the roller wheel moving upward are basically the same to each other when the cutting device works. In this way, the cutter wheel or the roller wheel may accurately reach working positions thereof without adding any other additional adjusting mechanism.

Referring to FIGS. 1-5, in an embodiment, the first transmission mechanism may further comprise a first transmitting seat 51 provided between the first positioning seat 41 and the support platform 12. The first transmitting seat 51 is connected to the cutter wheel support member 7. In this way, when the motor 1 rotates, the rotation of the motor 1 is converted to a linear movement of the first positioning seat 41 by the engagement of the first curved surface 21 of the double curved surface member 2 with the first roller 31. Then, the cutter head 9 is driven, by the first transmitting seat 51 and the cutter wheel support member 7, to linearly move. On the other hand, the second transmission mechanism may further comprise a second transmitting seat 52 provided between the second positioning seat 42 and the support platform 12. The second transmitting seat 52 is connected to the roller wheel support member 8. In this way, when the motor 1 rotates, the rotation of the motor 1 is converted to a linear movement of the second positioning seat 42 by the engagement of the second curved surface 22 of the double curved surface member 2 with the second roller 32. Then, the roller wheel 10 is driven, by the second transmitting seat 52 and the roller wheel support member 8, to linearly move. The first transmission mechanism and the second transmission mechanism are configured so that the assembly of the entire cutter head will become very easy.

In an embodiment, the first roller 31 is in contact with the first curved surface 21 in manner of higher pair contact, that is, the first roller 31 and the first curved surface 21 are engaged with each other in manner of a point contact or a line contact. The second roller 32 is in contact with the second curved surface 22 in manner of higher pair contact, that is, the second roller 32 and the second curved surface 22 are engaged with each other in manner of a point contact or a line contact. A lower surface of the first positioning seat 41 is in contact with an upper surface of the first transmitting seat 51 in manner of a surface contact, and a lower surface of the second positioning seat 42 is in contact with an upper surface of the second transmitting seat 52 in manner of a surface contact. In this way, as the motor 1 drives the double curved surface member 2 to rotate, the first curved surface 21 may drive the first roller 31 to rotate and move downward in a straight line simultaneously; on the other hand, the second curved surface 22 may drive the second roller 32 to rotate and move downward in a straight line simultaneously.

In the cutter head according to the above embodiments of the present disclosure, the double curved surface member 2 has a structure of the double curved surface cam, thereby, as the motor 1 drives the double curved surface member 2 to rotate clockwise, the first roller 31 is driven by the first curved surface while the second roller 32 is disengaged from and not driven by the second curved surface; then, the first roller 31 may press the first transmitting seat 51 downward through the first positioning seat 41, and the cutter wheel support member 7 and the cutter wheel 9 may be vertically moved downward with the first transmitting seat 51 in a straight line. On the other hand, as the motor 1 drives the double curved surface member 2 to rotate counterclockwise, the second roller 32 is driven by the second curved surface while the first roller 31 is disengaged from and not driven by the first curved surface; then, the second roller 32 may press the second transmitting seat 52 downward through the second positioning seat 42, and the roller wheel support member 8 and the roller wheel 10 may be vertically moved downward with the second transmitting seat 52 in a straight line. That is, the first roller 31 and the second roller 32 are alternately driven by the double curved surface member 2. In another embodiment, the motor 1 may be configured to rotate continuously in one direction.

In an embodiment, the double curved surface cam 2, the first roller 31, the first positioning seat 41, the first transmitting seat 51, the second roller 32, the second positioning seat 42 and the second transmitting seat 52 may be received in the protection case 6. The protection case 6 may prevent glass chips from splashing into the double curved surface cam.

Figure 3:
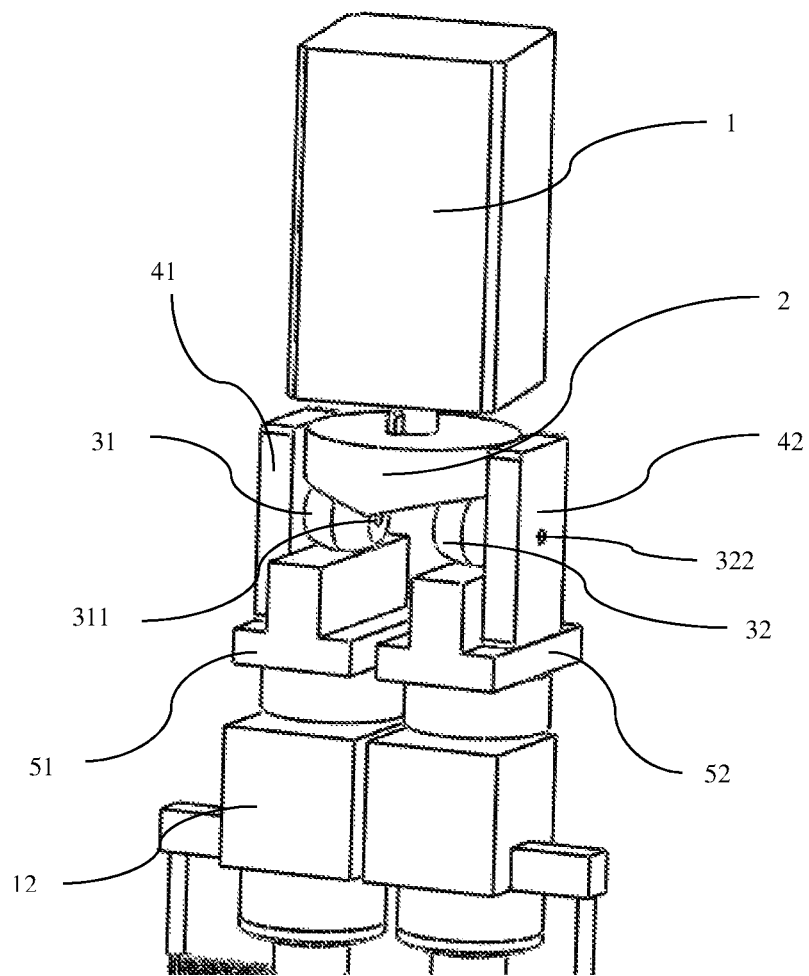
FIG. 3 is a local perspective view of the cutting device of FIG. 1.

As shown in FIGS. 1 and 3, in an embodiment, the cutter head may further comprise a first rotation shaft 311 and a second rotation shaft 322. The first rotation shaft 311 is fixed to the first positioning seat 41; the first roller 31 is rotatably connected to the first positioning seat 41 by the first rotation shaft 311 and freely rotatable about the first rotation shaft 311. The second rotation shaft 322 is fixed to the second positioning seat 42; the second roller 32 is rotatably connected to the second positioning seat 42 by the second rotation shaft 322 and freely rotatable about the second rotation shaft 322. Since the first rotation shaft 311 and the second rotation shaft 322 are fixed to the first positioning seat 41 and the second positioning seat 42, respectively, the first rotation shaft 311 and the second rotation shaft 322 are not rotatable.

Figure 4:
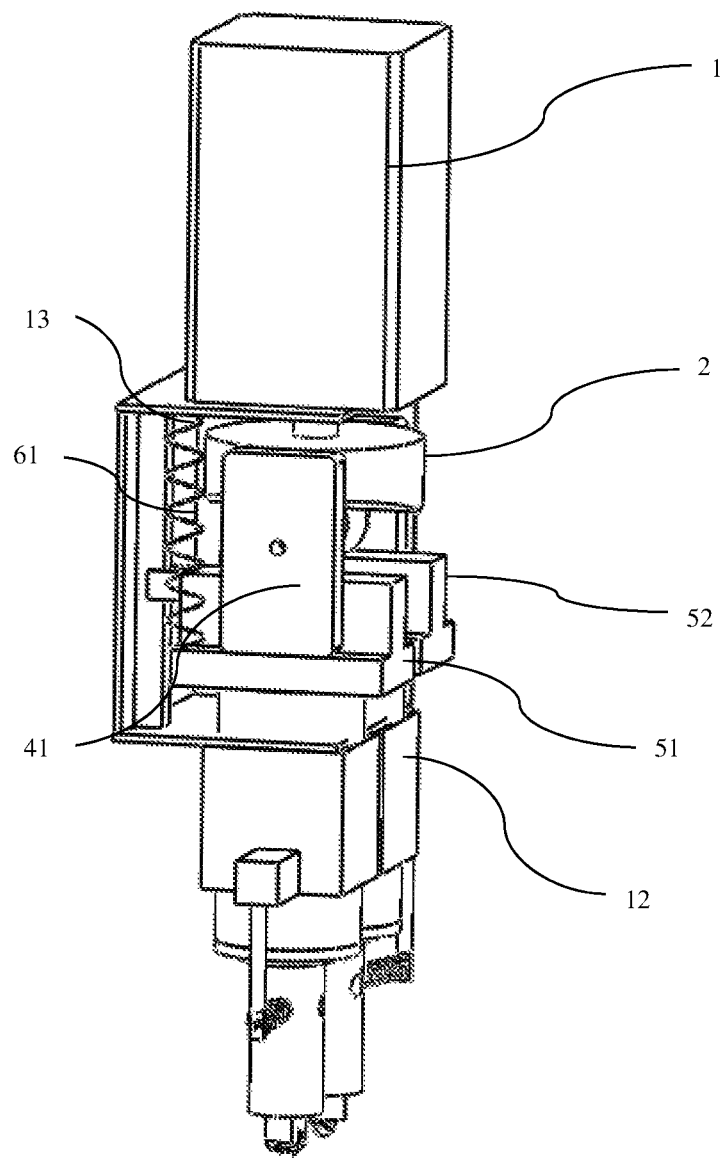
FIG. 4 is another side view of the cutting device of FIG. 1.

As shown in FIG. 4, in an embodiment, the first transmission mechanism further comprises a first reset spring 13.

The first transmitting seat 51 is moved against a spring force of the first reset spring 13 under driving of the first positioning seat 41. The second transmission mechanism further comprises a second reset spring. The second transmitting seat 52 is moved against a spring force of the second reset spring under driving of the second positioning seat 42. Specifically, the first transmitting seat 51 and the second transmitting seat 52 are connected to the protection case or the support platform 12 by the first reset spring 13 and the second reset spring (only a single reset spring is shown in FIG. 4), respectively. Two ends of the first or second reset spring are hooked to the protection case 6 and the first or second transmitting seat, respectively. In this way, the first transmitting seat and the second transmitting seat may automatically move upward to initial positions thereof when the respective roller or the respective positioning seat does not exert a downward force on them.

Figure 5:
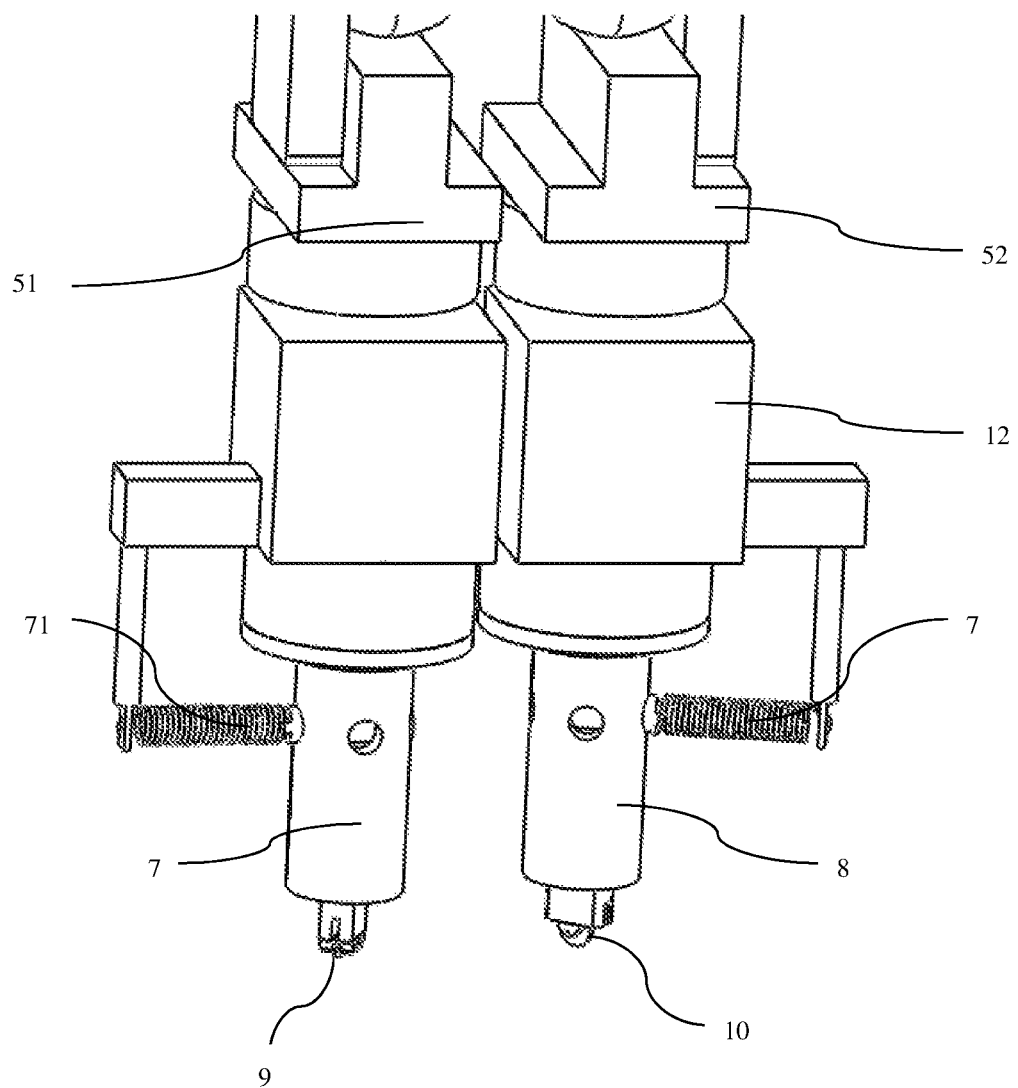
FIG. 5 is another local perspective view of the cutting device of FIG. 1.

As shown in FIGS. 1 and 5, in an embodiment, a third reset spring 71 is provided between the cutter wheel support member 7 and the support platform 12, the cutter wheel support member 7 is moved against a spring force of the third reset spring 71 under driving of the first transmitting seat 51. A fourth reset spring 72 is provided between the roller wheel support member 8 and the support platform 12, the roller wheel support member 8 is moved against a spring force of the fourth reset spring 72 under driving of the second transmitting seat 52. In this way, the cutter wheel 9 and the roller wheel 10 may be reset in an idle state where they are not driven by the first transmitting seat and the second transmitting seat. One end of the second reset spring 71 is hooked to the cutter wheel support member 7, and the other end of the second reset spring 71 is hooked to the support platform 12. One end of the fourth reset spring 72 is hooked to the roller wheel support member 8, and the other end of the fourth reset spring 72 is hooked to the support platform 12. For assembling easily, in the illustrated embodiment, the third reset spring is connected between the cutter wheel support member 7 and the support platform 12 by a L shape structure, and the fourth reset spring is connected between the roller wheel support member 8 and the support platform 12 by a L shape structure. In this way, the third reset spring and the fourth reset spring are configured to be horizontally oriented in the absence of force. But it should be appreciated for those skilled in this art that the third reset spring and the fourth reset spring may be configured to be vertically oriented in the absence of force. In this case, one end of the third or fourth reset spring is connected to the cutter wheel support member or the roller wheel support member, and the other end of the third or fourth reset spring is connected to the support platform. Please be noted that any suitable arrangement of the third reset spring and the fourth reset spring is covered within the scope of the present disclosure as long as the cutter wheel support member or the roller wheel support member can be reset.

In an embodiment, as shown in FIG. 1, a driving shaft of the motor 1 is connected to the double curved surface member 2 by a flat key. With such configuration, it may prevent the motor from being loosened from and moved relative to the double curved surface member, and ensure the connection strength between them.

As shown in FIG. 4, in an embodiment, the cutter head further comprises a first rail 61 and a second rail (not shown) fixed to the support platform 12 or the protection case 6. The first positioning seat 41 is mounted on the first rail 61 and movable along the first rail 61 in a straight line, and the second positioning seat 42 is mounted on the second rail and movable along the second rail in a straight line. In this way, the cutter wheel and the roller wheel may stably move in the straight line, achieving the precise positioning.

In the cutter head according to the above embodiments of the present disclosure, the cutter head is provided with the double curved surface member 2. As the motor 1 drives the double curved surface member 2 to rotate clockwise, the double curved surface member 2 drives the first roller 31 to rotate and move downward simultaneously; then, the first roller 31 drives the first positioning seat 41 connected to the first roller 31 to move downward along the rail 61 in a straight line; then, the first positioning seat 41 pushes the first transmitting seat 51 to move downward in a straight line; then, the first transmitting seat 51 pushes the cutter wheel support member 7 and the cutter wheel 9 carried on the cutter wheel support member 7 to vertically move downward in a straight line until the cutter wheel 9 is moved to the cutting position where the liquid crystal panel is cut by the cutter wheel 9; at the same time, the second transmitting seat 52 corresponding to the roller wheel 10 is moved upward and reset under the action of the second reset spring, and the roller wheel support member 8 and the roller wheel 10 are moved upward and reset under the action of the fourth reset spring 72.

As the motor 1 drives the double curved surface member 2 to rotate counterclockwise, the double curved surface member 2 drives the second roller 32 to rotate and move downward simultaneously; then, the second roller 32 drives the second positioning seat 42 connected to the second roller 32 to move downward along the rail 61 in a straight line; then, the second positioning seat 42 pushes the second transmitting seat 52 to move downward in a straight line; then, the second transmitting seat 52 pushes the roller wheel support member 8 and the roller wheel 10 carried on the roller wheel support member 8 to vertically move downward in a straight line until the roller wheel 10 is moved to the supporting position where the liquid crystal panel is supported by the roller wheel 10, so as to cooperate with another cutter wheel to cut the liquid crystal panel; at the same time, the first transmitting seat 51 corresponding to the cutter wheel 9 is moved upward and reset under the action of the first reset spring 13, and the cutter wheel support member 7 and the cutter wheel 9 are moved upward and reset under the action of the third reset spring 71.

According to another aspect of the present disclosure, there is provided a cutting device comprises a motor 1 and the above cutter head mentioned in any one embodiment of the present disclosure. A driving shaft of the motor 1 is connected to the double curved surface member 2 of the cutter head by a flat key, so as to drive the double curved surface member to rotate by the motor. In this way, it may prevent the motor from being loosened from or moved with respect to the cam, and it ensures the connection strength between them.

In the cutter head and the cutting device according to the above embodiments of the present disclosure, the cutter wheel or the roller wheel may be driven by using the motor to drive a double curved surface member; further, a protective case for protecting the cutter head is provided to prevent glass chips from entering into the double curved surface cam, and the production stability is improved; in addition, the cutter wheel and the roller wheel have compact structure, and it reduces the difficulty of adjusting the levelness of the cutter wheel and the roller wheel, thereby, it improves the levelness of the cutter wheel and the roller wheel, and improves the cutting accuracy.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A cutter head, comprising:
    a support platform;
    a double curved surface member mounted on the support platform and having a first curved surface and a second curved surface;
    a cutter wheel support member and a roller wheel support member moveably mounted on the support platform, respectively;
    a cutter wheel and a roller wheel mounted on the cutter wheel support member and the roller wheel support member, respectively;
    a first transmission mechanism mounted on the support platform, configured to be mated with the first curved surface, and connected to the cutter wheel support member, so as to transmit a movement of the double curved surface member to the cutter wheel; and
    a second transmission mechanism mounted on the support platform, configured to be mated with the second curved surface, and connected to the roller wheel support member, so as to transmit the movement of the double curved surface member to the roller wheel.

2. The cutter head according to claim 1, further comprising a protection case mounted on the support platform,
    wherein the double curved surface member, the first transmission mechanism and the second transmission mechanism are received in the protection case.

3. The cutter head according to claim 2,
    wherein the double curved surface member comprises a double curved surface cam, and the first curved surface and the second curved surface are rotationally symmetric with respect to each other.

4. The cutter head according to claim 3,
    wherein the first transmission mechanism comprises:
    a first roller rotatably coupled with the first curved surface of the double curved surface member; and
    a first positioning seat movably mounted on the support platform, the first roller being rotatably mounted on the first positioning seat, so as to transmit the movement of the double curved surface member to the cutter wheel as the first curved surface drives the first roller to rotate; and
    wherein the second transmission mechanism comprises:
    a second roller rotatably coupled with the second curved surface of the double curved surface member; and
    a second positioning seat movably mounted on the support platform, the second roller being rotatably mounted on the second positioning seat, so as to transmit the movement of the double curved surface member to the roller wheel as the second curved surface drives the second roller to rotate.

5. The cutter head according to claim 4,
    wherein the first transmission mechanism further comprises a first transmitting seat provided between the first positioning seat and the support platform and connected to the cutter wheel support member; and
    wherein the second transmission mechanism further comprises a second transmitting seat provided between the second positioning seat and the support platform and connected to the roller wheel support member.

6. The cutter head according to claim 5,
    wherein the first roller is in contact with the first curved surface via higher pair contact, and the second roller is in contact with the second curved surface via higher pair contact.

7. The cutter head according to claim 5,
    wherein the first transmission mechanism further comprises a first reset spring, the first transmitting seat being configured to be moved against a spring force of the first reset spring under driving of the first positioning seat; and
    wherein the second transmission mechanism further comprises a second reset spring, the second transmitting seat being configured to be moved against a spring force of the second reset spring under driving of the second positioning seat.

8. The cutter head according to claim 7,
    wherein the first reset spring is provided between the first transmitting seat and the protection case, and the second reset spring is provided between the second transmitting seat and the protection case.

9. The cutter head according to claim 5,
    wherein the first roller is rotatably connected to the first positioning seat by a first rotation shaft, and the second roller is rotatably connected to the second positioning seat by a second rotation shaft.

10. The cutter head according to claim 5,
    wherein a third reset spring is provided between the cutter wheel support member and the support platform, the cutter wheel support member being configured to be moved against a spring force of the third reset spring under driving of the first transmitting seat; and
    wherein a fourth reset spring is provided between the roller wheel support member and the support platform, the roller wheel support member being configured to be moved against a spring force of the fourth reset spring under driving of the second transmitting seat.

11. The cutter head according to claim 5, further comprising a first rail and a second rail fixed to the support platform,
    wherein the first positioning seat is mounted on the first rail and movable along the first rail in a first straight line, and the second positioning seat is mounted on the second rail and movable along the second rail in a second straight line.

12. A cutting device, comprising:
    a motor; and
    the cutter head according to claim 1, wherein a driving shaft of the motor is connected to the double curved surface member of the cutter head by a flat key, so as to drive the double curved surface member to rotate.

\* \* \* \* \*